(12) United States Patent
Brechner et al.

(10) Patent No.: US 9,741,061 B2
(45) Date of Patent: Aug. 22, 2017

(54) SYSTEM AND METHOD FOR PERSONAL CUSTOMIZATION OF DIGITAL CONTENT

(76) Inventors: Sarah Nash Brechner, Goodlettsville, TN (US); Anne E. Nash, Lexington, KY (US)

( * ) Notice: Subject to any disclaimer, the term of this patent is extended or adjusted under 35 U.S.C. 154(b) by 721 days.

(21) Appl. No.: 13/566,590

(22) Filed: Aug. 3, 2012

(65) Prior Publication Data
US 2013/0232221 A1  Sep. 5, 2013

Related U.S. Application Data

(60) Provisional application No. 61/605,345, filed on Mar. 1, 2012.

(51) Int. Cl.
| | | |
|---|---|---|
| G06F 17/30 | (2006.01) | |
| G06Q 30/06 | (2012.01) | |
| G06F 15/16 | (2006.01) | |

(52) U.S. Cl.
CPC .................................. G06Q 30/06 (2013.01)

(58) Field of Classification Search
CPC ............................................... G06F 17/30141
USPC ........................................................ 709/217
See application file for complete search history.

(56) References Cited

U.S. PATENT DOCUMENTS

| | | | |
|---|---|---|---|
| 7,457,852 B2 | 11/2008 | O'Rourke et al. | |
| 8,027,881 B2 | 9/2011 | Granich | |
| 8,032,943 B2 | 10/2011 | DeMello et al. | |
| 8,190,519 B1 | 5/2012 | Angilivelil et al. | |
| 8,478,855 B1 * | 7/2013 | Evans | G06F 9/541 |
| | | | 709/205 |
| 8,560,401 B1 * | 10/2013 | Bharara | G06Q 30/00 |
| | | | 705/26.1 |
| 8,595,059 B1 * | 11/2013 | Huang | G06Q 30/00 |
| | | | 705/14.1 |

(Continued)

FOREIGN PATENT DOCUMENTS

| | | | | |
|---|---|---|---|---|
| IL | WO 2011151678 A1 * | 12/2011 | ............. | G06F 21/10 |
| KR | 1020040082524 A | 9/2004 | | |

(Continued)

OTHER PUBLICATIONS

International Search Report in corresponding International Application No. PCT/US2013/028620, dated Jun. 26, 2013, 11 pp.

*Primary Examiner* — Kevin Bates
*Assistant Examiner* — Mark A Scott
(74) *Attorney, Agent, or Firm* — Patterson Intellectual Property Law, P.C.; Gary L. Montle

(57) ABSTRACT

A hosted server system includes a database, a processor, and computer program instructions for facilitating personal customization of digital media, such as for example gift messages to be coupled to e-books. The server system receives customization data and a digital media file from a third-party platform, and creates a record with a customized gift message file from the customization data. A file wrapper is generated with data indicating locations of the gift message file and the digital media file, which enables the third-party platform to selectively execute the customized gift message file and the digital media file. Alternatively, the initial data and request may be provided from a first platform, wherein an identifier is generated and transmitted to the first platform. Upon later receiving the identifier from a second platform, the file wrapper is generated and transmitted to the second platform.

20 Claims, 7 Drawing Sheets

(56) References Cited

U.S. PATENT DOCUMENTS

| | | | |
|---|---|---|---|
| 8,806,054 B1* | 8/2014 | Overton | G06F 3/048 709/232 |
| 9,152,629 B1* | 10/2015 | Waters | G06F 17/30011 |
| 2004/0139318 A1 | 7/2004 | Fiala et al. | |
| 2004/0167965 A1* | 8/2004 | Addante | H04L 12/5693 709/206 |
| 2004/0243698 A1* | 12/2004 | Blankenship | G06Q 10/107 709/224 |
| 2005/0192966 A1* | 9/2005 | Hilbert | G06F 17/30067 |
| 2005/0210108 A1* | 9/2005 | Covert | G06Q 10/107 709/206 |
| 2005/0267941 A1* | 12/2005 | Addante | G06Q 10/107 709/206 |
| 2006/0007243 A1 | 1/2006 | Miller | |
| 2007/0038717 A1 | 2/2007 | Burkholder et al. | |
| 2007/0233784 A1* | 10/2007 | O'Rourke et al. | 709/203 |
| 2008/0033812 A1 | 2/2008 | McKenna et al. | |
| 2008/0059287 A1* | 3/2008 | Bonet | G06F 17/30781 705/7.32 |
| 2008/0091796 A1* | 4/2008 | Story et al. | 709/217 |
| 2008/0168073 A1* | 7/2008 | Siegel | G06F 17/3002 |
| 2008/0168489 A1* | 7/2008 | Schraga | 725/32 |
| 2008/0249657 A1* | 10/2008 | Wendland | G06Q 30/00 700/235 |
| 2008/0294977 A1* | 11/2008 | Friedman et al. | 715/224 |
| 2009/0013252 A1* | 1/2009 | DeWitt | 715/716 |
| 2009/0070862 A1 | 3/2009 | Cuellar et al. | |
| 2009/0119772 A1* | 5/2009 | Awad | G06F 21/6218 726/21 |
| 2009/0241054 A1* | 9/2009 | Hendricks | G06F 17/3089 715/776 |
| 2009/0276784 A1* | 11/2009 | Grieve | G06F 9/44505 718/104 |
| 2009/0281794 A1* | 11/2009 | Ben-Haroush | G06Q 30/0603 704/201 |
| 2010/0114739 A1* | 5/2010 | Johnston | G06Q 30/0601 705/26.1 |
| 2010/0121763 A1* | 5/2010 | Vasudevan | G06Q 30/0603 705/39 |
| 2010/0216108 A1 | 8/2010 | Cooperman et al. | |
| 2010/0223314 A1* | 9/2010 | Gadel | G11B 27/034 709/200 |
| 2010/0325005 A1* | 12/2010 | Benisti | G06Q 10/107 705/26.1 |
| 2011/0023063 A1* | 1/2011 | McDonough et al. | 725/46 |
| 2011/0202606 A1* | 8/2011 | Agarwal | H04L 12/1859 709/206 |
| 2011/0270517 A1* | 11/2011 | Benedetti | G01C 21/20 701/533 |
| 2012/0011001 A1* | 1/2012 | Gross | G06F 17/243 705/14.66 |
| 2012/0101944 A1* | 4/2012 | Lin | G06F 21/554 705/44 |
| 2012/0158775 A1* | 6/2012 | Choi et al. | 707/769 |
| 2012/0191848 A1* | 7/2012 | Norair | H04W 52/0229 709/224 |
| 2012/0233242 A1* | 9/2012 | Murray | H04L 67/22 709/203 |
| 2012/0233267 A1* | 9/2012 | Miner | H04L 51/14 709/206 |
| 2012/0254761 A1* | 10/2012 | DeWitt | H04N 21/47205 715/733 |
| 2012/0284592 A1* | 11/2012 | Moharram | G06Q 50/01 715/201 |
| 2013/0006627 A1* | 1/2013 | Guthery | G10L 15/26 704/235 |
| 2013/0031208 A1* | 1/2013 | Linton | H04L 67/125 709/217 |
| 2013/0036200 A1* | 2/2013 | Roberts | H04L 65/4076 709/219 |
| 2013/0046781 A1* | 2/2013 | Frankel et al. | 707/769 |
| 2013/0117665 A1* | 5/2013 | Tagliaferri | G06F 17/24 715/255 |
| 2013/0132230 A1* | 5/2013 | Gibson | G06Q 30/0627 705/26.8 |
| 2013/0191708 A1* | 7/2013 | Song | G06Q 30/06 715/202 |
| 2013/0191728 A1* | 7/2013 | McKinney | G06F 17/211 715/243 |
| 2013/0226728 A1* | 8/2013 | Oghittu | G06Q 30/0621 705/26.5 |
| 2014/0122544 A1* | 5/2014 | Tran | G06F 21/10 707/825 |
| 2014/0214503 A1* | 7/2014 | Chircorian | G06Q 10/10 705/14.4 |
| 2014/0304583 A1* | 10/2014 | Fabbri | G06F 17/3089 715/234 |
| 2015/0235013 A1* | 8/2015 | Sundaresan | G06Q 30/0206 705/7.35 |

FOREIGN PATENT DOCUMENTS

| | | |
|---|---|---|
| KR | 1020070090657 A | 9/2007 |
| WO | 2012016032 A2 | 2/2012 |

\* cited by examiner

SYSTEM AND METHOD FOR PERSONAL CUSTOMIZATION OF DIGITAL CONTENT

CROSS-REFERENCES TO RELATED APPLICATIONS

This application claims benefit of the following patent application(s) which is/are hereby incorporated by reference: U.S. Provisional Patent Application No. 61/605,345, filed on Mar. 1, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to systems and methods for personal customization of digital content, as purchased from various digital content providers, and delivered to or consumed on various digital content devices. More particularly, the present invention relates to a hosted server system for generating customized gift message files based on user input and further generating file wrappers for use by content providers in selectively executing the gift message files alongside the associated digital content.

Consumers are beginning to keep more of their digital content "in the cloud", and stream it as needed. Downloads occur incrementally and on-demand. In one example, iTunes users are gaining the ability to buy content without downloading it. All they are really doing is acquiring the right to stream it to some device whenever they want it. In another example, book publisher O'Reilly & Associates provides "in-the-cloud" access to any item in their collection for a single monthly fee. Any book can be opened, and single pages are downloaded.

In another example, a Kindle book purchased from Amazon can be downloaded to any of the customer's Kindle-capable devices: Kindle, iPhone, desktop computer. If a new Kindle device is purchased, then this same Kindle book can be downloaded to the new device as well. The same purchased license applies to the same customer-content combination on all devices. Similarly, the customer can open the book and read to page 123 on one device, and then upon opening the book on another device the book will automatically open to page 123. Amazon's database associates the customer's location in the book with their license for the book. And that information is available to all of their devices associated with that account.

Most digital content providers operate a system which passes messages and maintains a transactional database containing descriptions of their content catalog, their customer account information, and their order history. The most practical and accepted means to transform a "customer order" into a "content access" is usually with transactions stored in their customer-facing database.

Permanence of the data which defines digital content customizations is achieved by identifying this as attributes of the content purchase. If the provider's user agent (web page, application, or the like) is used to describe a personal inscription on a purchase designated as a gift, the attributes of the inscription (inscription page template identification number, message text, customer-uploaded photo, etc.) become as much a part of the purchase as the purchasing customer's account number, content catalog identification number, purchase data, etc. Such transactions become part of the provider's "customer history" and exist forever, barring catastrophic data loss.

Similarly, user customizations such as inscriptions, dedications, gift-wrappings, and any other personalizations applied to the content are ideally handled by the content providers. The information which describes them will pass through their system along with customer orders in the form of data fields attributed to transactions, and passed as messages or stored in databases along with other data concerning the customer-license-content association.

Identified this way, any subsequent use of customization information, regardless of how it is actually implemented or rendered, may fall within the scope of the present invention. For example, the inscription may be made into a special page that is embedded in the downloaded file.

As another example, the inscription may be displayed by way of clicking a button on the web browser page being used by the customer to read the book "in the cloud."

As yet another example, the inscription may be transformed during its lifetime into EPUB, PDF, HTML, or WXYZ, within the scope of the present invention with respect to each instance.

As yet another example, the inscription may become a bit of leader video at the start of a movie further within the scope of the present invention, regardless of video format, or whether it was downloaded or streamed.

Similarly, indications of content customization given in the customer's collection display ("bookshelf," "cover flow browser," etc.) would be instantiations of the idea. While the details of the display might change ("little red bow at the top left corner" becomes "small gold star at the bottom right corner"), the idea that remains constant is of indicating in such a display that some customization of this content exists in this collection.

BRIEF SUMMARY OF THE INVENTION

Hosted server systems and computer-implemented methods are provided herein in accordance with the present invention for enabling the personal customization of digital media content such as for example e-books.

Exemplary customized digital content of the present invention is generally referred to herein as "gift messages" but may include without limitation personal messages, inscriptions, dedications, gift tags, "gift-wrapped" deliveries, and the like.

One aspect of systems and methods in accordance with the present invention includes the implementation of techniques for specifying customization options for creating personalized gifts from digital content, such as the addition of personalized messages, inscriptions, dedications, gift tags, "gift-wrapped" deliveries, and the like.

In another aspect, systems and methods of the present invention include the implementation of techniques for associating selected customization options with a user's digital content collection within the content provider's database. This data may be incorporated into the user's digital content collection databases on their personal devices (computers, media players, phones, etc.).

In another aspect, systems and methods of the present invention further include techniques embedding customization option selections within the user's personal copy of the digital content files.

In another aspect, systems and methods of the present invention include techniques for indicating the presence and nature of the various content customizations.

In yet another aspect, systems and methods of the present invention further include techniques for presenting customized content upon delivery and viewing or displaying various customization options upon subsequent access to the content.

DETAILED DESCRIPTION OF THE INVENTION

Figure 1:
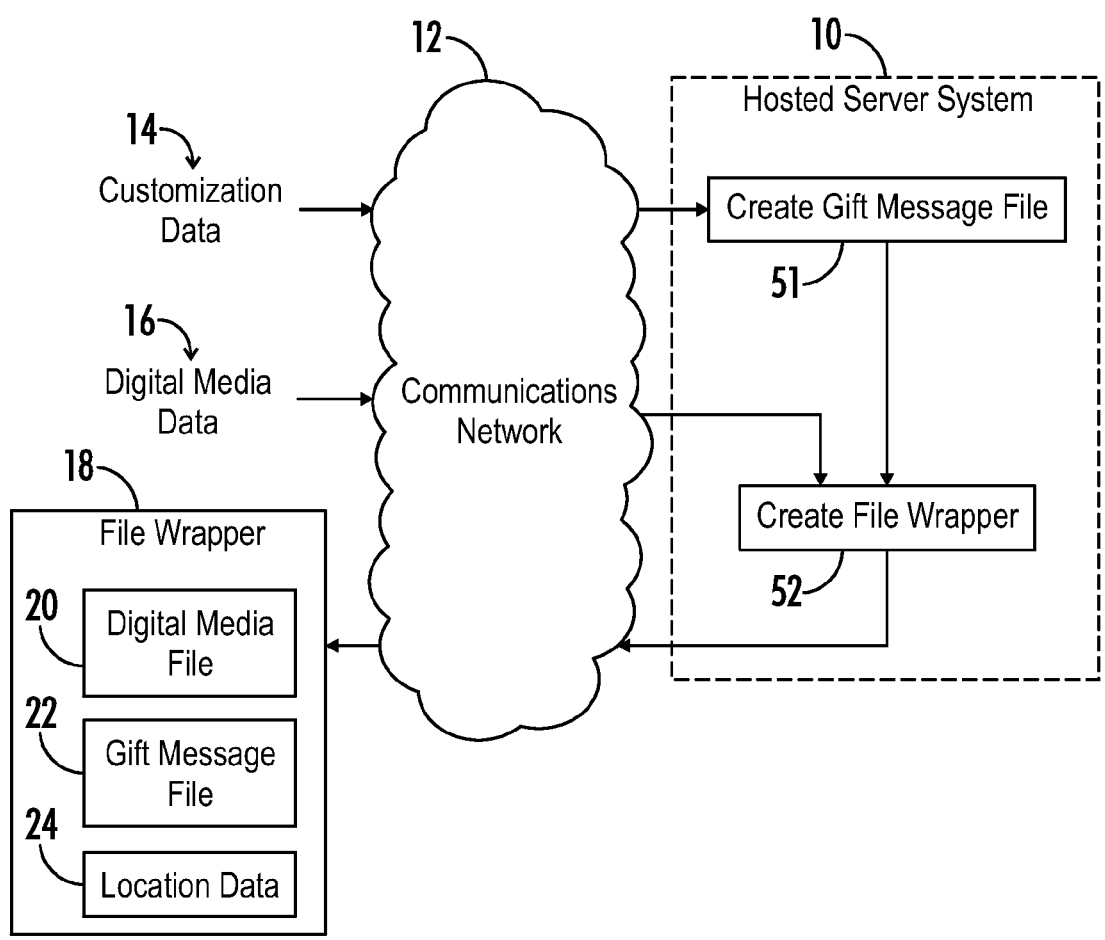
FIG. 1 is a block flow diagram representing a basic exemplary process flow in accordance with embodiments of the hosted server system of the present invention.

Referring generally to FIGS. 1-7, various exemplary embodiments are described herein of systems and methods for enabling personal customization of digital media content such as for example e-books. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a server system, computer program, signal processor, logic or alternative analog or digital electronic device that may be transformative of signals represented as physical quantities, whether automatically or manually initiated.

Referring first to FIG. 1, a general block flow diagram is provided representing an exemplary process carried out by a hosted server system 10 according to the present invention. The system 10 is linked to various platforms executed from user, client and other third-party servers and devices via a communications network 12. The platforms could include without limitation websites, mobile apps, desktop apps and the like, as may be generally appreciated by those of skill in the art. The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The system 10 may typically receive customization data 14 via the communications network 12 and create a gift message file 22 based on the customization data 14 (step S1). The customization data 14 represents a media type for the desired gift message which may be the same as a media type for the associated digital media content (e.g., e-book), but this is not necessarily the case and the creator of the gift message (typically the purchaser of the digital media content) may be enabled to select the media type from a list of predetermined options in concert with generation of the customization data. The type of gift message media is generally unimportant to the host system 10, as long as the proper customization data is received and stored in a manner permitting creation of a gift message file 22.

The system 10 also receives digital media data 16 via the communications network 12. The digital media data 16 may include a digital media file 20, but alternatively may merely include data indicating a location of the digital media file 20 in a remote database. The digital media data 16 may further include details associated with the digital media file 20 as may be relevant for generating a gift message file 22 or otherwise controlling execution of or indicating an execution preference for the respective files 20, 22.

The system 10 upon request by a third-party platform, typically further relating to a request by a recipient user seeking to execute either or both of the digital media file 20 and the gift message file 22, creates a file wrapper 18 which includes the digital media file 20, the gift message file 22 and location data 24 whereby the third-party platform may identify and suitably execute the respective files. The location data 24 may typically take the form of metadata or the equivalent within the file wrapper 18. The file wrapper 18 is then transmitted via the communications network 12 to the third-party platform for selective execution and display to the recipient.

A hosted server system 10 of the present invention may include one or more servers functionally linked and effective thereby to carry out processes and steps as further described herein for facilitating personal customization of digital media. An exemplary hosted server system 10 of the present invention as represented for example in FIG. 2 includes a processor 32 and one or more computer-readable memory media 34 for executing, providing or otherwise implementing the features of the invention.

The term "computer-readable memory medium" 34 as used herein may refer to any non-transitory medium alone or as one of a plurality of non-transitory memory media within which is embodied a computer program product 36 that includes processor-executable software, instructions, program modules, etc., 36 which upon execution may provide data or otherwise cause a computer system to implement subject matter or otherwise operate in a specific manner as further defined herein. It may further be understood that more than one type of memory media may be used in combination to conduct processor-executable software, instructions, program modules, etc., from a first memory medium upon which the software, instructions or program modules initially reside to a processor for execution.

The computer program product 36 as described above may be executable to generate an application programming interface (API) 30 as a framework for interaction with various otherwise disparate third-party platforms, a graphical user interface (GUI) 40, and various program modules effective to receive and stored data, create message files and file wrappers, execute program algorithms and/or otherwise implement additional features of the present invention.

The term "user interface" as used herein may unless otherwise stated include any input-output module with respect to the hosted server including but not limited to web portals, such as individual web pages or those collectively defining a hosted website, mobile desktop applications, telephony interfaces such as interactive voice response (IVR), and the like. Such interfaces may in a broader sense include pop-ups or links to third-party websites for the purpose of further accessing and/or integrating associated materials, data or program functions via the hosted system and in accordance with methods of the present invention.

The present invention may typically be implemented in accordance with two primary types of third party agents: providers and customers.

The term "customer" as used herein may typically refer to end users of a system generally including both of a digital media content provider (front end platform) and the hosted server system generating the gift message file as personal customization associated with the digital media content (back end platform). Such end users may include either or both of a purchaser and a consumer of digital content. This distinction may be made for example in view of the purchaser and the consumer being different people or entities, each having for example a separate account with a digital media content provider. A purchaser may "buy" content and give it to the consumer. Further, the purchaser and consumer may operate on different devices or platforms, as may be an important consideration in view of implementation aspects of the present invention.

The term "provider" as used herein may typically but without limitation refer to an operator, administrator or the like of a third-party platform associated with a digital media content provider system, which thereby provides digital content for sale to customers via an electronic purchase and delivery platform. Generally stated, providers license digital content from content creators (e.g., authors, studios, record labels, developers, etc.) and provide networked access to that content for their customers. Typically, some type of sub-license is sold to customers through an online catalog and transaction processing system. Examples of digital content providers as are presently known in the art but are not limiting on the scope of the term as used herein include Apple (iTunes, AppStore, iBookstore), Amazon (Kindle, MP3 Store, Instant Video, Appstore), Netflix, Google, etc.

While the content provider and host system may often define a "front-end" and "back-end" operation, respectively, as described above, in various embodiments the hosted server system may perform either or both roles. For example, a customer may access a hosted website for the purpose of generating/creating a gift message file for subsequent use in conjunction with digital media content that is otherwise purchased from a content provider, wherein the hosted server system performs a front-end function. However, a recipient of the gift message would typically interact with the content provider itself to obtain or display the digital media content, wherein the host system operates as a back-end source for the file wrapper including the gift message file and the digital media file as may be further described below.

Figure 2:
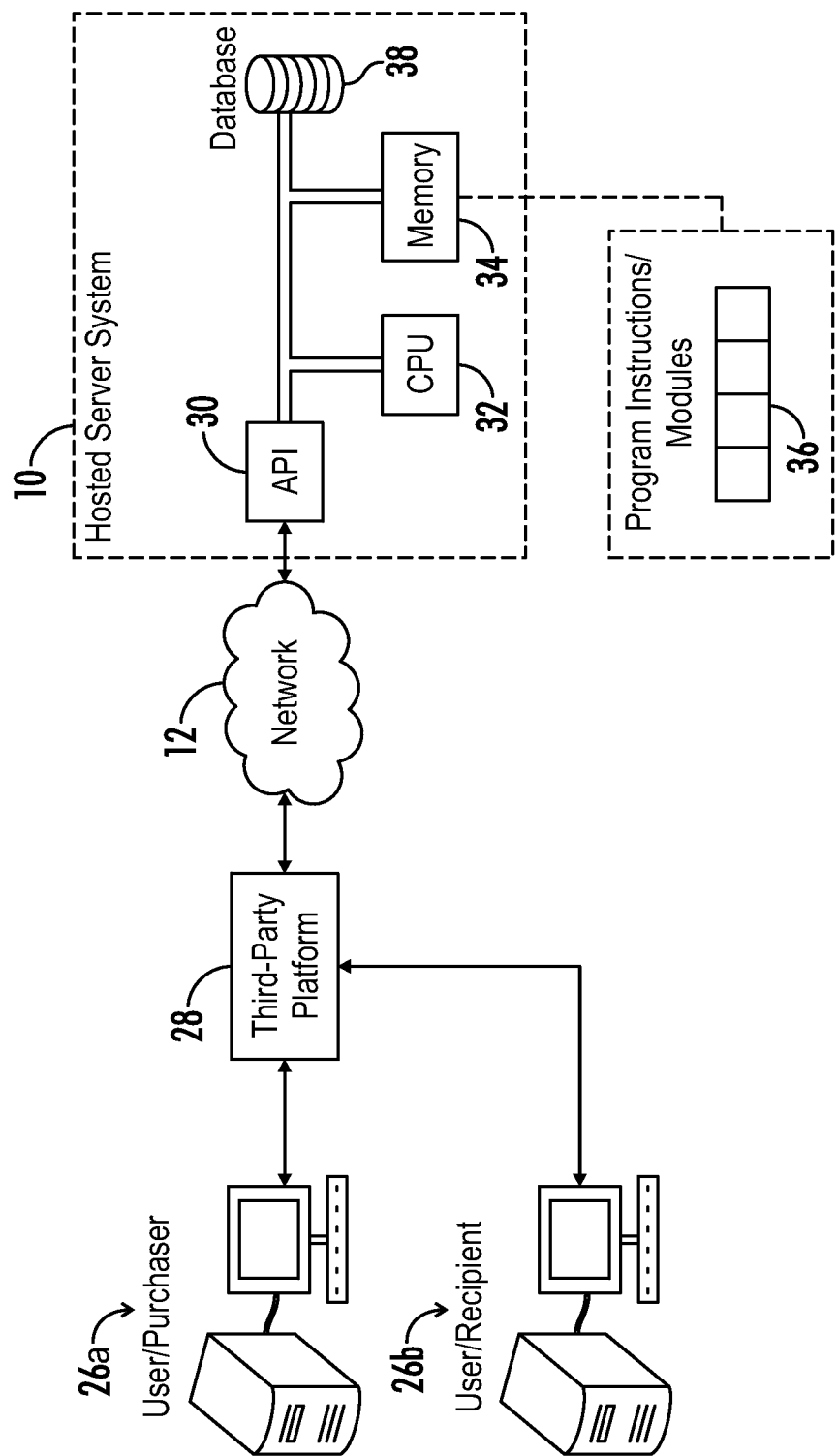
FIG. 2 is a block diagram representing an exemplary hosted server system according to an embodiment of the present invention.
Figure 3:
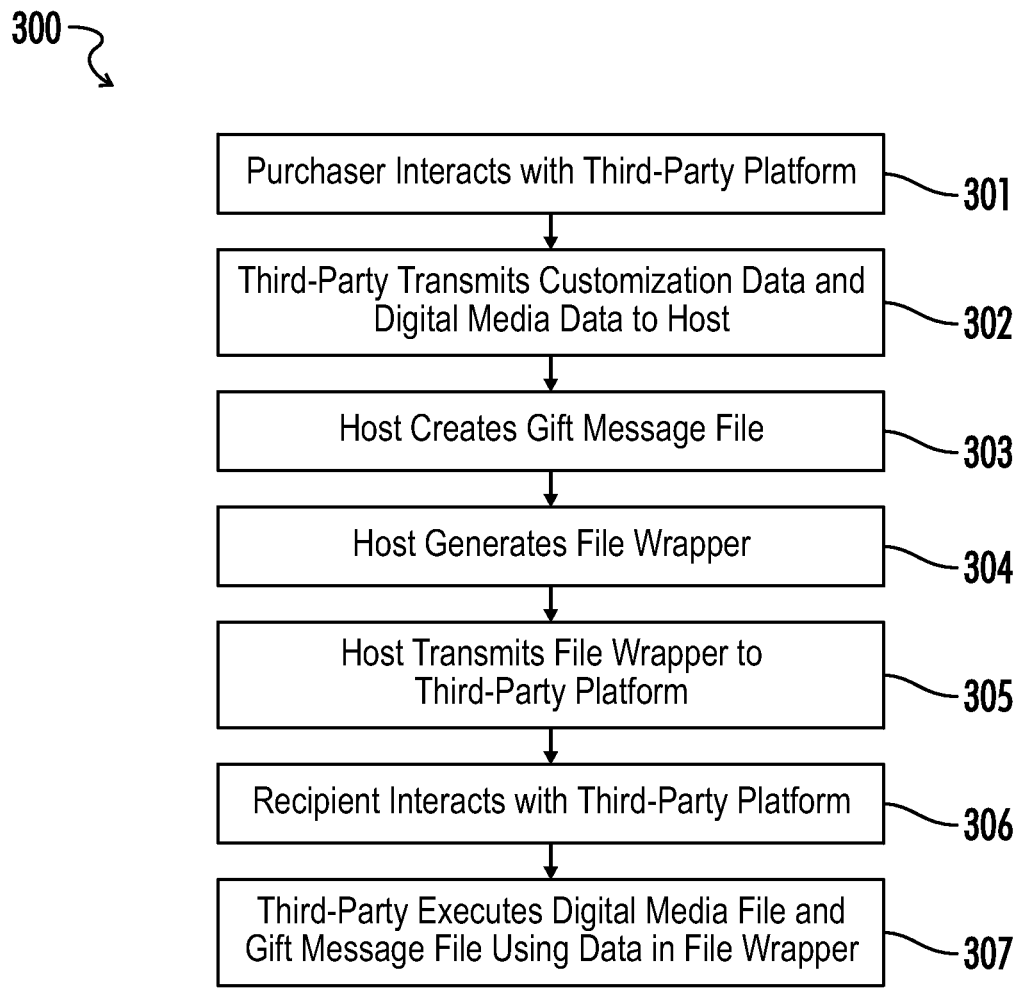
FIG. 3 is a flowchart representing an exemplary method as executable by a system of the present invention.

An exemplary process 300 as represented in FIG. 3 may now be described in the context of a system 10 as previously described with reference to FIG. 2.

A first user as a purchaser of digital media content (e.g., an e-book, video, etc.) interacts directly with a third-party platform which may generally be associated with a content provider (step 301). The purchaser may generally be acquiring the digital media content from the third-party platform in accordance with the interaction of step 301, but this is not necessarily always the case and more particularly according to this step the purchaser interacts with the third-party platform to request or otherwise initiate creation of a gift message to be executed in association with the digital media content.

The third-party platform receives, acquires or otherwise generates customization data in a format suited for the gift message requested by the purchaser, and forwards the customization data along with digital media data to an application programming interface (API) for the hosted server system (step 302).

The customization data as described above may be of any media type supported by the host server system and appropriate to the type of gift message being requested, such as for example as needed to create an image file, video file, audio file, or the like. The customization data may generally be the source data which is used by program modules in the hosted server system to create a gift message, or may in some cases include a link to a remote source such as a user device which may be further facilitated via a hosted user interface, by which the purchaser can generate the source data in direct communication with the hosted server system.

The digital media data may in various embodiments include a file with the digital media content itself, as may be executed and consumed directly, or may include a link to a remote database or other location where the digital media content is reliably found and executable therefrom. In certain embodiments, the digital media data may include both, and further may include other information associated with the content, the purchaser, the content provider, etc., as needed or useful depending on the context.

Upon receiving the customization data the hosted server system, generally via the API, may create a dedicated record in a hosted database. The record may be created individually with respect to a particular transaction, i.e. the file wrapper to be generated based on the specific data received, but such records may be categorized on the basis of the purchaser, the third-party platform, the digital media content, or any or all of the above. The host system may then execute a program module for generating a gift message file based on the received and stored data (step 303), and may further store the gift message file for subsequent retrieval or alteration. In the present exemplary embodiment, the host system within the same transaction further generates a file wrapper including the gift message file, the digital media data, and any other location data or other information such as metadata as needed for location and execution of the associated data files (step 304). The file wrapper does not alter the underlying data files, but merely defines a virtual container or object within which the files reside or are otherwise encapsulated, and which is transmitted and stored in association with metadata directing the location and execution of the files.

The file wrapper is transmitted by the host system to the third-party platform via the API and the communications network (step 305). In the embodiment represented in FIGS. 2 and 3, there is no additional interaction with or by the hosted system in association with the particular gift message or file wrapper. Upon receiving the file wrapper, the gift message is ready for subsequent execution by the third-party platform or any other content provider as may be provided the file wrapper. Typically, the purchaser may identify a recipient of the digital media content and the gift message, or provide the recipient with a token or other identifier by which the third-party platform may identify the recipient. The recipient then interacts with the third-party platform in order to request execution of the digital media content and/or the gift message (step 306), at which point the third-party platform may use the data in the file wrapper to selectively execute files therein (step 307). The gift message may be executed directly upon request by the recipient, or may be executed automatically by the platform in accordance with a request by the provider for execution of the digital media content.

Figure 4:
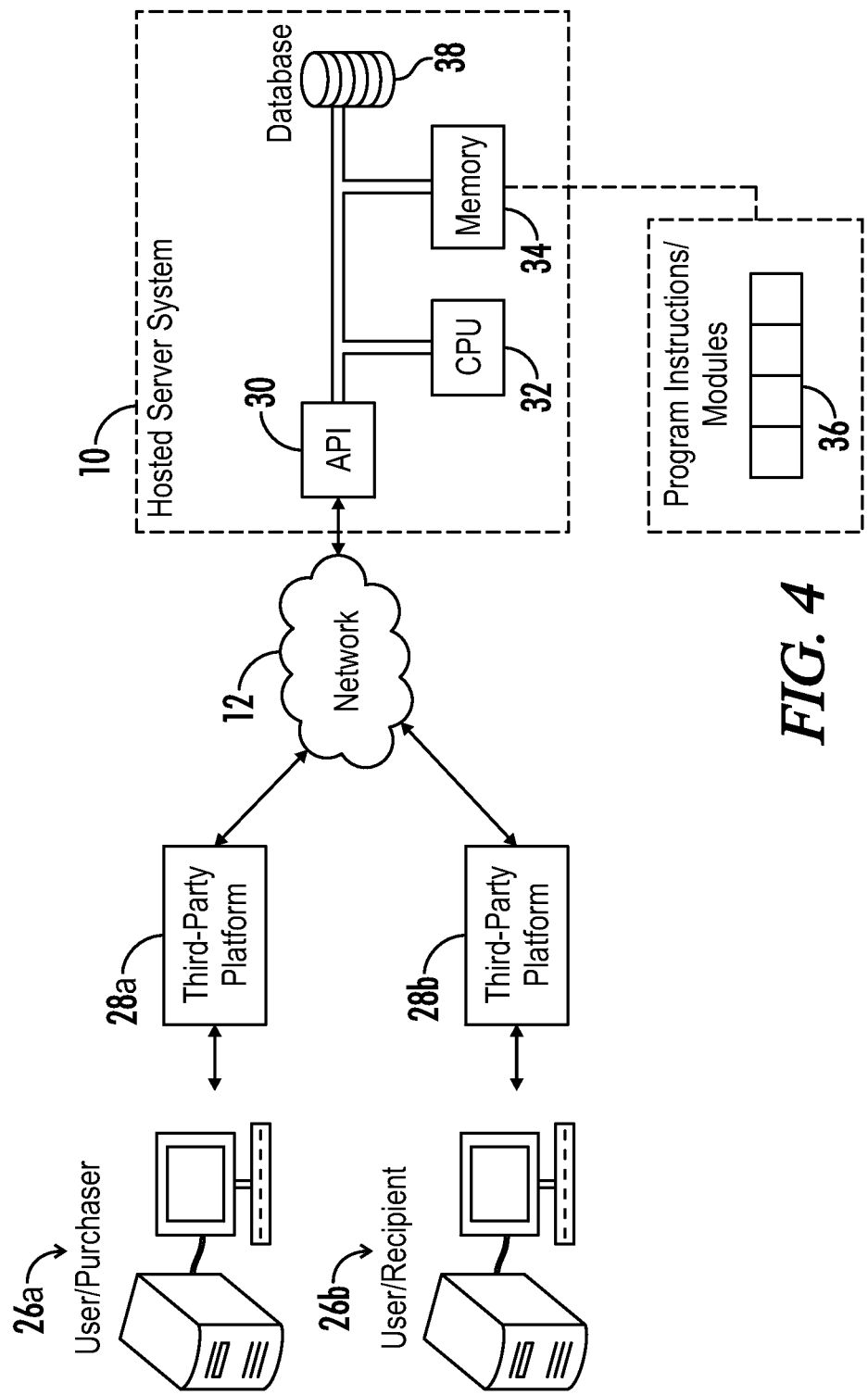
FIG. 4 is a block diagram representing an exemplary hosted server system according to another embodiment of the present invention.
Figure 5:
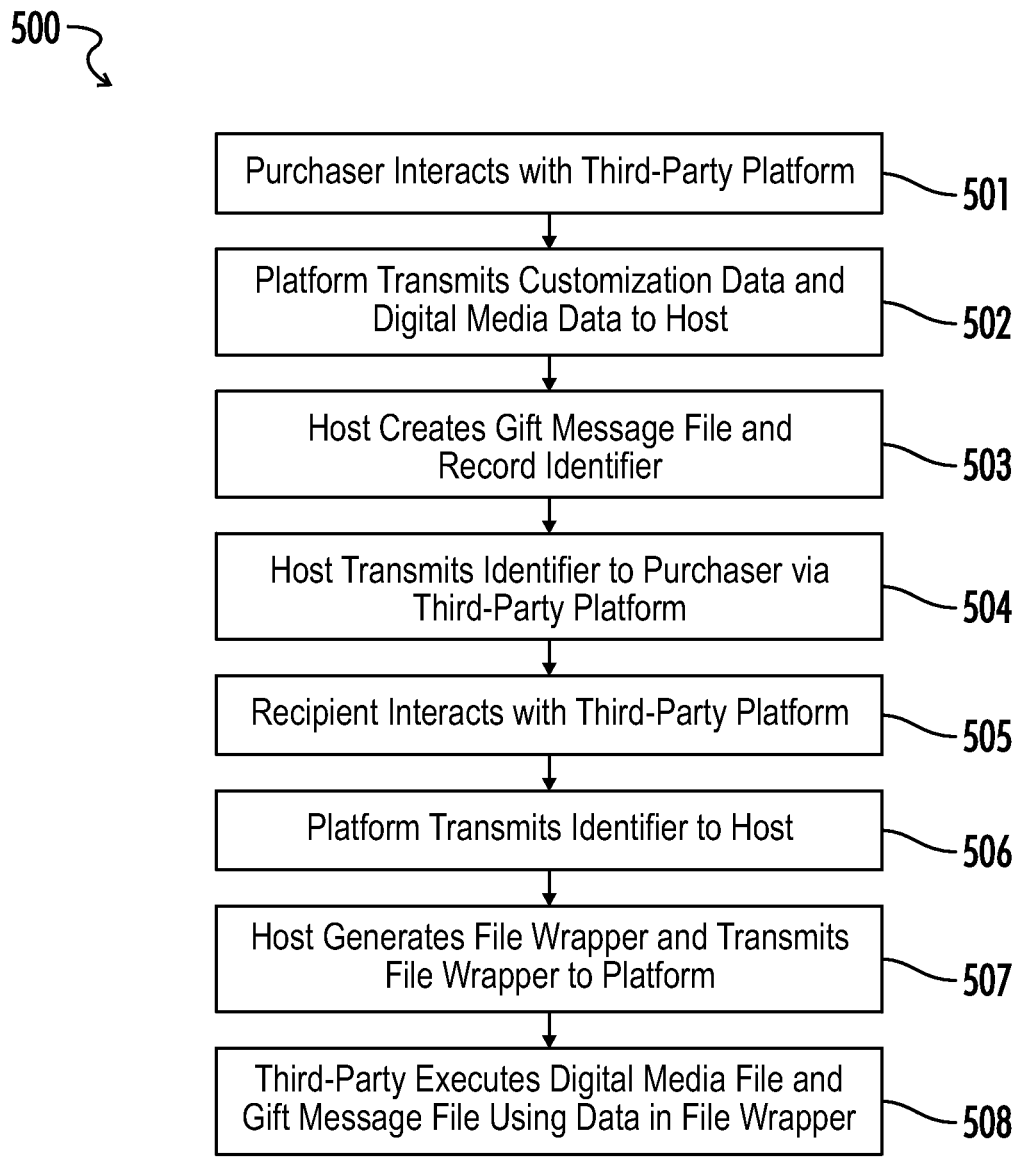
FIG. 5 is a flowchart representing another exemplary method as executable by a system of the present invention.

Referring now to FIGS. 4 and 5, another exemplary process 500 may now be described in the context of a hosted server system 10 of the present invention. The process 500 differs primarily from the process 300 described above only in that the third-party provider 28a with whom the purchaser interacts may be, but is not necessarily, the same as the third-party provider 28b with whom the recipient interacts for execution of the purchased digital media content and gift message.

As with the process 300 above, the process 500 of the present embodiment begins with a user/purchaser interacting with a first third-party platform 28a (step 501) and the platform transmitting customization data and digital media data to the hosted server system (step 502). The host stores the data in a database record and creates a gift message file. In the present embodiment, the host further creates a record identifier such a textual or numerical password, a token, or the like (step 503), and transmits the identifier to the purchaser via the third-party platform (step 504). In this way the purchaser may typically receive the identifier and provide the identifier to an intended recipient of the gift message and the digital media content at his/her convenience and in whatever form is desired or otherwise appropriate.

The recipient subsequently interacts with a third party platform 28b, typically for the purpose of consuming (e.g., viewing, hearing, etc.) the digital media content and/or the gift message (step 505). The third party platform 28b with whom the recipient interacts in this embodiment may or may not be the same platform 28a as that with whom the purchaser interacts. In either case, the recipient provides the record identifier to the platform, or otherwise identifies themself in such a manner that the platform is able to obtain the identifier, and the platform transmits the identifier to the hosted server system (step 506). The host generates and transmits a file wrapper (step 507) in much the same manner as in steps 304-305 of the process 300 described above, and the third party platform 28b likewise selectively executes the digital media file and the gift message file using data in the file wrapper (step 508) in much the same manner as in step 307 of the process 300 described above.

Figure 6:
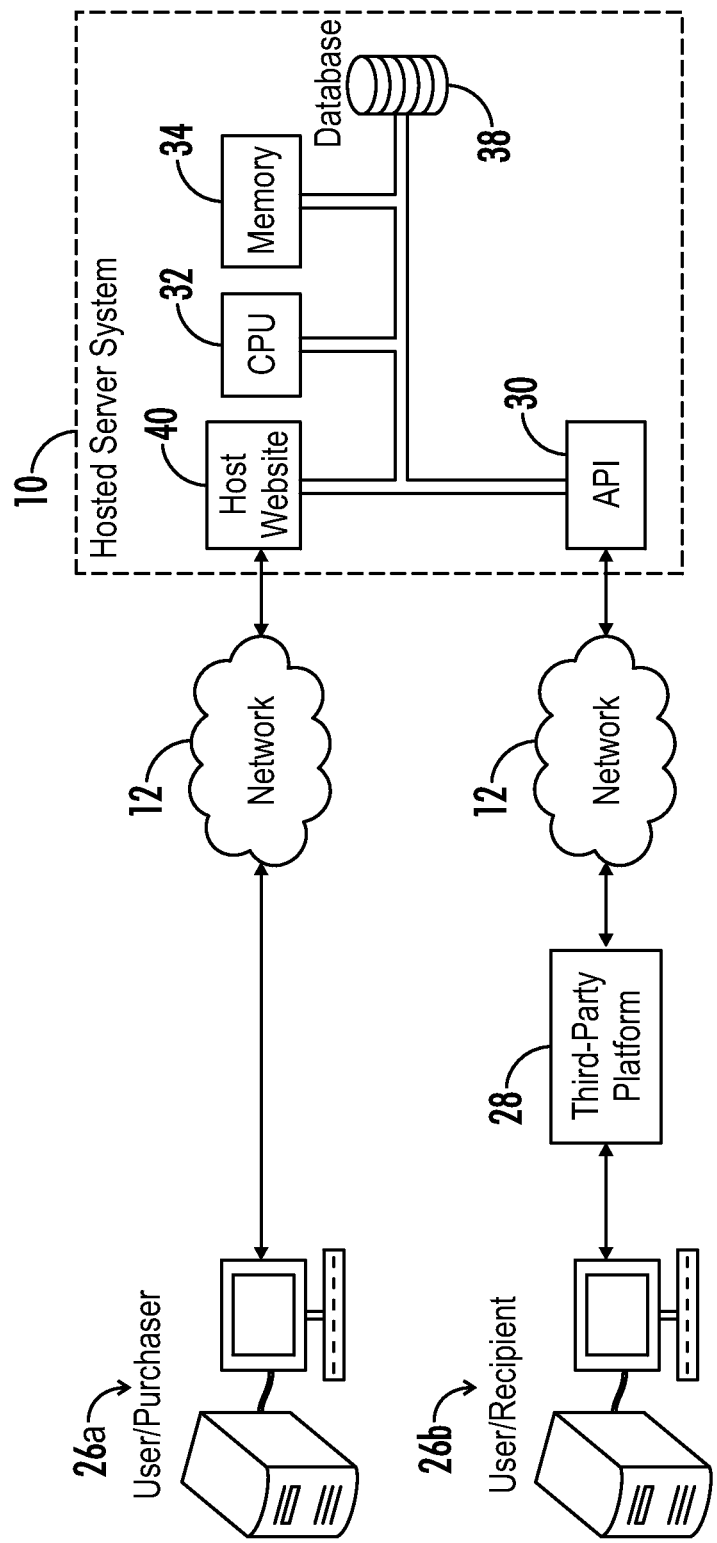
FIG. 6 is a block diagram representing an exemplary hosted server system according to another embodiment of the present invention.
Figure 7:
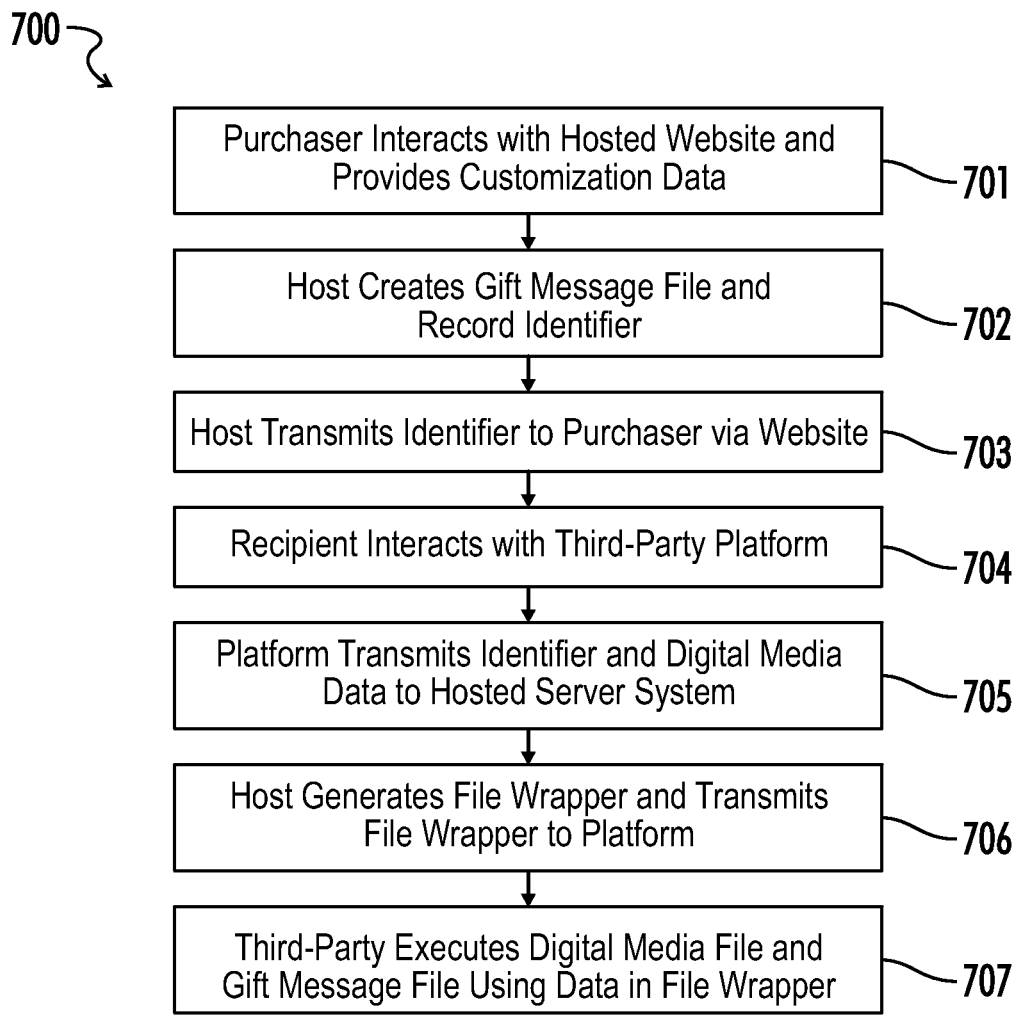
FIG. 7 is a flowchart representing another exemplary method as executable by a system of the present invention.

Referring now to FIGS. 6 and 7, another exemplary process 700 may now be described in the context of a hosted server system 10 of the present invention. The process 700 differs from the processes 300, 500 described above in at least that the hosted server system 10 enables the user/purchaser to interact directly with the host via a front-end interface such as a hosted website or mobile application. In a first step, therefore, rather than the purchaser interacting with a third-party platform the purchase now interacts with the host interface and provides at least customization data for enabling the creation of a gift message (step 701).

In an exemplary embodiment as represented in FIG. 6, the purchaser may first purchase the media content from a first third-party provider and subsequently navigate to or otherwise enter the hosted interface in order to create a gift message associated with the purchased content. In an alternative embodiment, the purchaser may upon purchasing the media content be presented with a pop-up box, link, or the like, such that the purchaser may be interfaced with the hosted server system during or immediately after the transaction with the third party platform. In another embodiment, the hosted server system may itself be a content provider such that the purchaser is able to select and purchase the media content and further be enabled to create a gift message by the host as part of the same front-end transaction.

As with the process 500 above, the process 700 of the present embodiment continues with the host storing the data in a database record and creating a gift message file and a record identifier (step 702), and transmitting, displaying or otherwise providing the identifier to the purchaser (step 703). A distinction of note here is that whereas in the process 500 above the hosted server system transmits the identifier to the purchaser via a third party platform, in the process 700 of the present embodiment the host merely provides the identifier to the purchaser directly.

The remaining four steps 704-707 of the process 700, wherein the recipient interacts with a third party platform 28b and ultimately consumes the media content and/or the gift message as selectively executed by the platform, may typically be substantially similar to the last four steps 505-508 of the process 500 above. In certain embodiments, however, where the hosted server system may also be a content provider as described above, the steps involving generation and transmission of a file wrapper may be omitted, as the host may selectively execute the media content file and the gift message file based on stored information associated with the identifier as presented by the recipient.

Where the hosted server system 10 includes particular front-end functionality, such as for example as a digital media content provider, the system may typically include additional structure beyond that required to merely generate gift message files and file wrappers as described above. In an embodiment, an exemplary hosted server system 10 may comprise a database and one or more program modules which may include without limitation a catalog module, purchasing module, delivery module and customization module, each of which may further include or be associated with various algorithms, communications channels, user interfaces and the like as may be necessary to implement the associated functions and as may be further understood by one of skill in the art.

The catalog module handles the database of content available for purchase. It manages the presentation of available content, provides searching and recommendation functions, and interfaces with the purchasing module to allow customers to select catalog items for purchase. When a web browser is directed to a hosted website, the customer normally begins by interacting with the catalog module.

The purchasing module is where the customer is directed to when a web browser is directed by some control (e.g., button) on a catalog module page which indicates a desired completion of a transaction. From this module, a customer can specify payment options, provide shopping information, or describe specific purchasing options such as gift wrapping, inscription, and the like.

The delivery module may for example and without limitation on the scope of the present invention provide any one or more of available downloads, gift codes (creation, transmission and redemption), "gift-wrapped" deliveries, persistent gift indicators, and the like.

The customization module may for example and without limitation on the scope of the present invention provide any one or more of personal messages (inscriptions, dedications, etc.), "gift-wrapped" delivery options and/or other customizations as may be understood by those in the art, and presentations.

The database or equivalent data source may for example and without limitation include customer accounts, orders, licenses (purchases, rentals, subscriptions, etc.), licensed content (music, movies, TV shows, apps, books, etc.), and associated customer content (personal inscriptions, delivery options, comments, ratings, etc.).

In exemplary methods in accordance with the present invention, an interaction between customer and provider systems may begin and end in substantially similar fashion to a method as implemented by analogous systems which are currently known in the art. However, in a method implemented by a hosted server system of the present invention as a content provider, the system generates a user interface whereby customers may request the customization of content items that have been selected for purchase in a given order. In response to such a request, the host system further generates a list, array or equivalent grouping of available customizations which may be associated with the particular content item(s). In response to a customer request from the generated list or grouping, the system may then complete the order in an equivalent manner to that implemented by previously known systems, with the exception that the order is committed to the hosted database with the desired customization.

In various embodiments the content item may be stored with the desired customization already applied, or may alternatively be stored in association with a desired customization which may automatically or optionally be applied in subsequent downloads, displays or equivalent consumptions of said item.

Consumers of the content item (which may or may not be same entity or using the same device as the actual purchaser or purchasing device) may then direct their devices to retrieve and display or play previously purchased (licensed) content. Exemplary interactions may include a mode by which the consumer downloads the content from the hosted database and stores the content locally for subsequent consumption, another mode by which the consumer streams the content from the hosted database or a database associated therewith in a "cloud"-implemented application, or additional modes by which the system for example notifies the consumer that customizations are available for display or download in an associated content item and provides links, indications, pop-ups or the like in association with the notification or an associated user selection received from the consumer in response to the same.

In a particular example, while browsing a website or other equivalent user interface associated with a content provider system (e.g., an iTunes page), a customer finds a book they would like to give as a gift to a friend. The customer activates the content item action menu and chooses a "Gift to friend" option. The system then continues to a transactional panel wherein the gift delivery and any personal message may be set up using features as are currently known in the art. Within the scope of the present invention, the system may further provide a selection box or equivalent command option by which the personal message may further be converted into an inscription page for customization of the associated content.

Optionally, the system may direct a page to be generated which allows the customer to choose from an array of inscription page templates which may be text, audio, video, or other mediums, wherein the personal message may be formatted and shown in a style and layout associated with the template.

Further optionally, the system may direct the generation of a user-selectable option to have the gift initially delivered with gift-wrapped or an equivalent effect. An example of how this effect may be implemented with respect to the consumer includes delivering the personal message and gift-wrap display options to the purchasing module, storing them in the hosted (content provider system) database and in association with the purchaser at the time the order is placed, and extracting them at such time as an icon representing the gift is selected by the consumer from a display. An animated removal of the gift-wrapping may for example be performed, after which time the contained digital image may be revealed or otherwise provided.

In one example, the customization instructions could be inserted into the hosted database and be permanently associated with the user's license for accessing the content.

In another example, the customization instructions could be downloaded and inserted into the user's digital content library database at the same time that the content itself is downloaded.

In yet another example, customizations could be added to digital content by embedding instructions for the customizations into the (encrypted) digital content file when it is delivered to (or downloaded by) the user (or license holder). This would work by embedding the instructions into specially designated "customization sections" of the content file, prior to encryption and transmission of the content file to the customer.

In one example, an electronic book which has been received as a gift could be initially displayed within the user's content collection as being gift-wrapped (e.g., wrapping paper, bow, tag) until after it has been accessed. When accessed, such as for example via a click to "open" it, a brief (<1 sec) animation could play to indicate that a gift is being opened for the first time. An accompanying soundtrack of tearing paper could play along with the animation, to enhance the overall impression of opening a physical gift. In another example, a user's content collection display could subsequently decorate the marker for a gifted digital content item with an indication, icon, flag, highlight, etc., to give a subtle indication that this item was received as a gift.

Further, items showing an indication of being a gift could be accessed or activated in a unique way to then trigger the display of some customization, such as a personal inscription. In one example, an on-screen display of the user's digital book collection with simulated shelves showing an array of book covers, could decorate the covers of gifted books with small icons.

A method in accordance with the present invention further includes techniques for enabling or disabling the display of any or all customizations or indications of customization.

Any combination of these examples as provided herein may be used by a hosted server system according to the present invention. As but one example, a host (in the context of a digital content provider) may incorporate content customization by choosing the desired customization from the available options, selecting the desired template, completing the template, and committing the choices to the purchasing order.

In various embodiments, digital content customizations may typically be stored in the hosted (content provider's) database in association with the customer's account and their purchase (license) of the customized content. Information may be associated with downloaded or transferred files, or replicated in a partial transfer of the customer account information, but in either event the master source of the information resides in the content provider's database.

Upon receiving notification that customized content has been received, an initial presentation of the customized content may be implemented such as for example as described above wherein the gift-wrapped item is displayed, clicked on the unwrap, and revealed in association with a brief animation. For subsequent presentations of the customized content, small markers may be generated in the collection display indicating that the content item was previously received as a gift.

In various embodiments of the present invention, when digital content items are downloaded or otherwise rendered as "local" items (e.g., files, web pages, media streams, gaming sessions, etc.), the content may be encrypted using public-key encryption as is known in the art.

The previous detailed description has been provided for the purposes of illustration and description. Thus, although there have been described particular embodiments of the present invention of a new and useful "System and Method for Personal Customization of Digital Content," it is not intended that such references be construed as limitations upon the scope of this invention except as may be set forth in the following claims.

What is claimed is:

1. A hosted server system comprising a hosted database, a processor, and a non-transitory computer-readable medium having program instructions embodied therein and executable by the processor to cause the performance of:
   receiving customization data and digital media data from a third-party digital media content provider platform via a communications network,
      wherein the third-party digital media content provider platform comprises a content provider database having a collection of digital content associated with digital media files stored thereon,
      wherein the digital media data is associated with a first customer purchase of a license to access digital content associated with at least a first digital media file, and
      wherein the customization data is provided by the digital media content provider based upon initiation from the first customer;
   creating a record comprising a customized gift message file and associated gift message based on the customization data and storing the record in the hosted database;
   generating a file wrapper comprising data indicating a location of the customized gift message file and a location of the digital media file associated with the digital media data; and
   transmitting the file wrapper to the third-party platform via the communications network,
      wherein upon execution of the file wrapper upon request by the first customer or an identified recipient of the first customer purchased license, the data enables the third-party platform to selectively present the gift message in accordance with licensed access to the digital content associated with at least the first digital media file.

2. The server system of claim 1, wherein generating the file wrapper further comprises generating data formatted according to predetermined criteria associated with the particular third-party platform and thereby readable by the particular third-party platform.

3. The server system of claim 2, wherein the file wrapper is encrypted according to predetermined criteria associated with the particular third-party platform.

4. The server system of claim 1, wherein receiving the digital media data comprises receiving data indicating a location of the digital media file in association with a remote database,
   further wherein the file wrapper comprises data readable by the third-party platform and indicating a location of the customized gift message file in the hosted database and the location of the digital media file on the remote database.

5. The server system of claim 1, wherein receiving the digital media data comprises receiving the digital media file,
   the file wrapper comprising the customized gift message file, the digital media file, and data readable by the third-party platform and indicating a location for each of the customized gift message file and the digital media file in the file wrapper.

6. The server system of claim 5, the customized gift message file selectively executable by the third-party platform any one or more of before, during and after execution of the digital media file.

7. The server system of claim 1, wherein receiving the digital media data comprises receiving the digital media file,
   the file wrapper comprising a standalone digital file further comprising the customized gift message file and the digital media file, the gift message file and the digital media file executable in a predetermined sequence.

8. A hosted server system comprising a hosted database, a processor, and a non-transitory computer-readable medium having program instructions embodied therein and executable by the processor to cause the performance of:
   receiving customization data and digital media data from a first third-party digital media content provider platform via a communications network,
      wherein the first third-party digital media content provider platform comprises a content provider database having a collection of digital content associated with digital media files stored thereon,
      wherein the digital media data is associated with a first customer purchase of a license to access digital content associated with at least a first digital media file, and
      wherein the customization data is provided by the first digital media content provider based upon initiation from the first customer;
   creating a record comprising a customized gift message file and associated gift message based on the customization data and storing the record in the database;
   generating an identifier associated with the record;
   transmitting the identifier to the first third-party platform via the communications network;
   receiving the identifier from a second third-party digital media content provider platform via the communications network, wherein the second third-party platform is associated with a second customer as an intended recipient of the license to access the digital media file and the customized gift message;
   generating a file wrapper comprising data indicating a location of the customized gift message file and a location of the digital media file; and
   transmitting the file wrapper to the second third-party platform via the communications network,
      wherein upon execution of the file wrapper upon request by an identified recipient of the first customer purchased license, the data enables the second third-party platform to selectively present the gift message in accordance with licensed access to the digital content associated with at least the first digital media file.

9. The server system of claim 8, wherein generating the file wrapper further comprises generating data formatted according to predetermined criteria associated with the second third-party platform and thereby readable by the second third-party platform.

10. The server system of claim 9, wherein the file wrapper is encrypted according to predetermined criteria associated with the second third-party platform.

11. The server system of claim 8, wherein receiving the digital media data comprises receiving data indicating a location of the digital media file in association with a remote database,
further wherein the file wrapper comprises data readable by the second third-p arty platform and indicating a location of the customized gift message file in the hosted database and the location of the digital media file on the remote database.

12. The server system of claim 8, wherein receiving the digital media data comprises receiving the digital media file, the file wrapper comprising the customized gift message file, the digital media file, and data readable by the second third-party platform and indicating a location for each of the customized gift message file and the digital media file in the file wrapper.

13. The server system of claim 12, the customized gift message file selectively executable by the second third-party platform any one or more of before, during and after execution of the digital media file.

14. The server system of claim 8, wherein receiving the digital media data comprises receiving the digital media file, the file wrapper comprising a standalone digital file further comprising the customized gift message file and the digital media file, the gift message file and the digital media file executable in a predetermined sequence.

15. A hosted server system comprising a hosted database, a processor, and a non-transitory computer-readable medium having program instructions embodied therein and executable by the processor to cause the performance of:
generating a user interface accessible via a communications network and effective to
present one or more catalog items corresponding to digital media content for selection and purchase by a user of a license to access thereof, and
enable the user to provide customization data in association with a purchased license to access selected digital media content;
creating a record comprising a customized gift message file and associated gift message based on the customization data and storing the record in the hosted database;
generating an identifier associated with the record and transmitting the identifier to the user via the user interface;
receiving the identifier and digital media data from a third-party digital media content provider platform via the communications network;
generating a file wrapper comprising data indicating a location of the customized gift message file and a location of a digital media file associated with the digital media content; and
transmitting the file wrapper to the third-party platform via the communications network,
wherein upon execution of the file wrapper upon request by the user or an identified recipient of the user-purchased license, the data enables the third-party platform to selectively present the gift message in accordance with licensed access to the digital content associated with at least the digital media file.

16. The server system of claim 15, wherein generating the file wrapper further comprises generating data formatted according to predetermined criteria associated with the third-party platform and thereby readable by the third-party platform.

17. The server system of claim 15, wherein receiving the digital media data comprises receiving data indicating a location of the digital media file in association with a remote database,
further wherein the file wrapper comprises data readable by the third-party platform and indicating a location of the customized gift message file in the hosted database and the location of the digital media file on the remote database.

18. The server system of claim 15, wherein receiving the digital media data comprises receiving the digital media file,
the file wrapper comprising the customized gift message file, the digital media file, and data readable by the third-party platform and indicating a location for each of the customized gift message file and the digital media file in the file wrapper.

19. The server system of claim 18, the customized gift message file selectively executable by the third-party platform any one or more of before, during and after execution of the digital media file.

20. The server system of claim 15, wherein receiving the digital media data comprises receiving the digital media file,
the file wrapper comprising a standalone digital file further comprising the customized gift message file and the digital media file, the gift message file and the digital media file executable in a predetermined sequence.

* * * * *